Patented June 24, 1930

1,768,363

UNITED STATES PATENT OFFICE

HERBERT V. LECKIE, OF STRATFORD, AND WATSON H. WOODFORD, OF BRIDGEPORT, CONNECTICUT, ASSIGNORS TO REMINGTON ARMS COMPANY, INC., A CORPORATION OF DELAWARE

PLASTIC COMPOSITION

No Drawing. Original application filed August 9, 1920, Serial No. 402,276. Divided and this application filed December 24, 1926. Serial No. 156,984.

This invention relates to a plastic composition of matter which is especially useful as an insulating medium for the heating element of electric heating devices, although its utility is by no means limited to this particular class of appliances.

This application is a division of our prior co-pending application S. N. 402,276, filed August 9th, 1920, relating to an electric heater. Such electric heating appliances as electric irons, soldering irons, cooking utensils, room heaters etc. usually comprise an electrically conductive heating element which is placed in proximity to a heater body adapted to receive and store heat from the heating element. The efficiency of such heaters is greatly increased by providing a short direct heat conducting path between the heating element and the heater body. If the heat from the heating element is required, in order to reach the heater body, to pass through one or more layers of non-conducting materials, such as air or the usual insulating materials, a very substantial loss of heat occurs.

The present invention comprises the discovery of a plastic composition which has an unusual combination of properties. It is heat conducting, and at the same time substantially electrically insulating, and is capable of withstanding high temperatures without disintegration or decomposition.

The chief ingredients of the composition are ground slate, baked or calcined ground slate and fused silicon carbide. While the proportions of the ingredients may be varied between wide limits, a desirable formula includes the three substances in substantially equal proportions. The composition is prepared for use by moistening a mixture of the three ingredients with a solution of sodium silicate. If desired, a small quantity of soapstone may be added. The moistened composition may be then applied to a heating element which preferably is placed upon an insulating base, the heating element being completely imbedded in and covered by the composition. The composition is then permitted to dry for a considerable time after which it is baked at a comparatively high temperature. Although the baking temperature may vary widely, the use of a temperature of 1600° F. has been found to give excellent results. In this operation the plastic material sets into a hard, refractory substance having both a high electrical resistance, and very good heat conductivity. It withstands high temperatures without fusing or disintegrating, and without the emission of gases, hence it is very desirable for insulating heating units which are to be cast into a heater body. In heaters so constructed the composition forms a direct heat conducting path between the heating element and the heater body, eliminating the loss of heat which occurs when the heater body is separated from the heating element by substances which are poor conductions of heat.

The ingredients and proportions may be widely varied, the invention being limited only by a broad interpretation of the appended claims.

What is claimed is:

1. A heat conducting refractory composition for electric heating units comprising silicon carbide, ground slate, calcined ground slate, and sodium silicate.

2. A heat conducting refractory composition for electric heating units comprising ground slate, calcined ground slate, and sodium silicate.

3. A heat conducting refractory composition for electric heating units comprising silicon carbide, calcined ground slate, and sodium silicate.

4. A heat conducting refractory composition for electric heating units comprising calcined ground slate and sodium silicate.

HERBERT V. LECKIE.
WATSON H. WOODFORD.